United States Patent [19]

Kusakabe

[11] Patent Number: 4,959,974
[45] Date of Patent: Oct. 2, 1990

[54] AIR-CONDITIONING CONTROL SYSTEM WITH FREEZING CHAMBER-EQUIPPED REFRIGERATOR FOR VEHICLES

[75] Inventor: Hideshi Kusakabe, Konan, Japan

[73] Assignee: Diesel Kiki Co., Ltd., Tokyo, Japan

[21] Appl. No.: 380,879

[22] Filed: Jul. 17, 1989

[30] Foreign Application Priority Data

Jul. 28, 1988 [JP] Japan .................. 63-100930

[51] Int. Cl.$^5$ .............................. F25B 5/02
[52] U.S. Cl. ...................... 62/228.5; 62/157; 62/199; 62/231; 62/244
[58] Field of Search .............. 62/228.1, 228.4, 228.5, 62/229, 226, 227, 199, 200, 244, 196.1, 196.2, 196.3, 231, 157; 236/1 EA

[56] References Cited

U.S. PATENT DOCUMENTS

| | | | |
|---|---|---|---|
| 4,439,998 | 4/1984 | Horvay et al. | 62/199 |
| 4,565,072 | 1/1986 | Fujiwara et al. | 62/196.2 |
| 4,720,982 | 1/1988 | Shimizu et al. | 62/228.4 X |
| 4,766,735 | 8/1988 | Gotou | 62/199 X |

FOREIGN PATENT DOCUMENTS 62-91774  4/1987  Japan .

*Primary Examiner*—Harry B. Tanner
*Attorney, Agent, or Firm*—Frishauf, Holtz, Goodman & Woodward

[57] ABSTRACT

An air-conditioning control system for use in an automotive vehicle comprises a variable capacity compressor having capacity thereof being variable by an external control signal, at least one first cooling unit for cooling a vehicle compartment, and a second cooling unit for cooling a refrigerator. A first valve is arranged between the compressor and the first cooling unit for connecting them to cause same to form a cooling circuit when the first valve is open. A second valve is arranged between the compressor and the second cooling unit for connecting them to cause same to form a refrigerating circuit when the second valve is open. A valve control unit controls opening and closing of the first and second valves. A compressor control unit is responsive to opening and closing of the first and second valves for supplying a predetermined control signal to the compressor, when the second valve is open, for increasing the capacity of the compressor to such a degree as to enable making ice in a freezing chamber of the refrigerator.

8 Claims, 6 Drawing Sheets

1

AIR-CONDITIONING CONTROL SYSTEM WITH FREEZING CHAMBER-EQUIPPED REFRIGERATOR FOR VEHICLES

BACKGROUND OF THE INVENTION

This invention relates to an air-conditioning control system for vehicles, which is provided with a freezing chamber-equipped refrigerator, and particularly to an air-conditioning control system of this kind which is adapted for use in automotive vehicles for commercial purposes or for leisure time amusement, such as a station wagon.

Conventionally, an air-conditioning control system of the above kind for vehicles, which has its refrigerating circuit also used for operating a refrigerator installed in the vehicle, has been proposed e.g. by Japanese Provisional Patent Publication (Kokai) No. 62-91744. This air-conditioning control system is characterized by not only concurrent air-conditioning and refrigeration but also air-conditioning alone or refrigeration alone.

If the proposed air-conditioning control system is used to operate a freezing chamber-equipped refrigerator having the function of freezing (making ice) as the refrigerator, and at the same time a variable capacity compressor is used as the compressor, there arises a problem that the compressor is controlled to vary its capacity in response to thermal load, so that the refrigerator cannot always exhibit refrigerating ability sufficient to ensure ice making in the freezing chamber.

SUMMARY OF THE INVENTION

It is the object of the invention to provide an air-conditioning control system for vehicles, which is provided with a freezing chamber-equipped refrigerator which forms a refrigerating circuit together with a variable capacity compressor and can always exhibit sufficient refrigerating ability to make ice in a freezing chamber thereof.

To attain the above object, the present invention provides an air-conditioning control system for use in an automotive vehicle including a compartment, and refrigerator having a freezing chamber, which comprises:

a variable capacity compressor having capacity thereof being variable by an external control signal;

at least one first cooling unit for cooling the compartment;

a second cooling unit for cooling the refrigerator;

a first valve arranged between the compressor and the first cooling unit for connecting them to cause same to form a cooling circuit when the first valve is open;

a second valve arranged between the compressor and the second cooling unit for connecting them to cause same to form a refrigerating circuit when the second valve is open;

first control means for controlling opening and closing of the first and second valves; and second control means responsive to opening and closing of the first and second valves for supplying a predetermined control signal to the compressor, when the second valve is open, for inceasing the capacity of the compressor to such a degree as to enable making ice in the freezing chamber.

Preferably, the predetermined control signal makes the capacity of the compressor the maximum.

Alternatively, the predetermined control signal varies the capacity of the compressor such that temperature within the freezing chamber becomes equal to a predetermined freezing temperature.

More preferably, the air-conditioning control system includes a switch for operating the first cooling unit, and the second control means supplies the predetermined control signal to the compressor irrespective of whether the switch is closed or open.

The above and other objects, features, and advantages of the invention will become more apparent from the ensuing detailed description taken in conjunction with the accompanying drawings.

DETAILED DESCRIPTION

Embodiments of an air-conditioning control system according to the invention will now be described with reference to the accompanying drawings.

Figure 1:
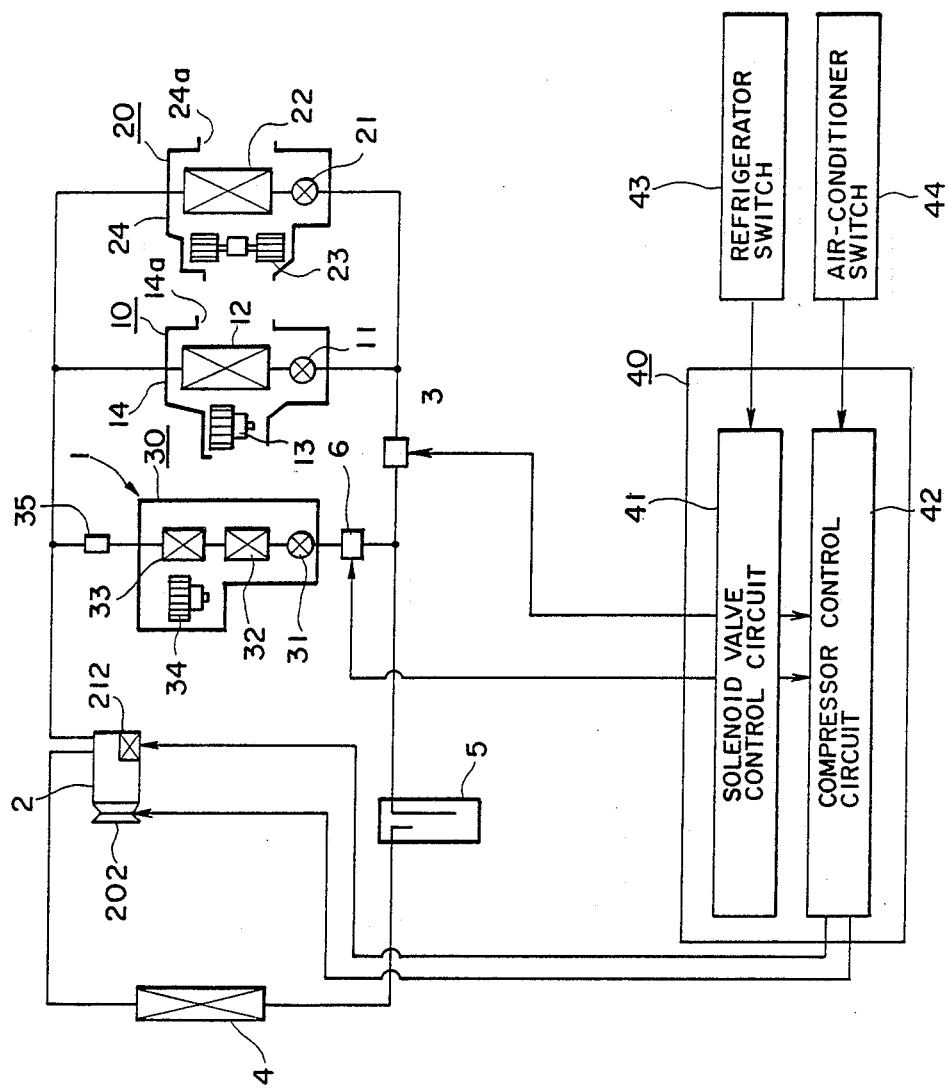
FIG. 1 is a schematic diagram showing the arrangement of an air-conditioning control system for vehicles according to the invention.

FIG. 1 shows the arrangement of the air-conditioning control system for vehicles. The air-conditioning control system is adapted to be installed on an automotive vehicle for commercial purposes or for leisure time amusement, such as a station wagon, and provided with a freezing chamber-equipped refrigerator 1 having a function of freezing (making ice). The air-conditioning control system includes a variable capacity compressor 2, a condenser 4, a liquid tank 5, a front cooling unit (first cooling unit) 10, a rear cooling unit (first cooling unit) 20, a refrigerating unit (second cooling unit) 30 of the refrigerator 1, and a control unit 40. The units 10, 20, and 30 are connected in parallel with each other. The cooling units 10, 20 are connected via a first solenoid valve 3 to the compressor 2, the condenser 4, and the liquid tank 5 to form respective cooling circuits together therewith when the first solenoid valve 3 is open, while the refrigerating unit 30 is connected to the compressor 2, the condenser 4, and the liquid tank 5 via a second solenoid valve 6, to form a refrigerating circuit together therewith when the second solenoid valve 6 is open.

The variable capacity compressor 2 may be a variable capacity wobble plate compressor (hereinafter simply referred to as "the compressor") which is controlled by an external electric signal from the control unit 40 to vary the capacity thereof.

The refrigerating unit 30 comprises an automatic expansion valve 31 connected by way of the second solenoid valve 6 to the liquid tank 5, a chilling evaporator 32 connected to the outlet side of the expansion valve 31 for chilling a cold storage chamber of the refrigerator 1, a freezing evaporator 33 connected to the outlet side of the chilling evaporator 32 for freezing a freezing chamber in which a chill tray is arranged, and a blower motor 34. Connected to the outlet side of the freezing evaporator 33 is a low pressure switch 35 which operates, when pressure at the outlet of the evaporator 33 is below a predetermined value, to make the compressor inoperative.

The front cooling unit 10 is for cooling the front side of a compartment of the automotive vehicle, and comprises an automatic expansion valve 11 connected by way of the first solenoid valve 3 to the liquid tank 5, an evaporator 12 connected to the outlet side of the expansion valve 11, a blower motor 13, and a duct 14 having air outlets 14a for blowing cold air into the front side of the compartment. The outlet side of the evaporator 12 is connected to the suction side of the compressor.

Similarly, the rear cooling unit 20 is for cooling the rear side of the compartment, and comprises an automatic expansion valve 21 connected by way of the first solenoid valve 3 to the liquid tank 5, an evaporator 22 connected to the outlet side of the expansion valve 21, a blower motor 23, and a duct 24 having air outlets 24a for blowing cold air into the rear side of the compartment. The outlet side of the evaporator 22 is connected to the suction side of the compressor.

Figure 2:
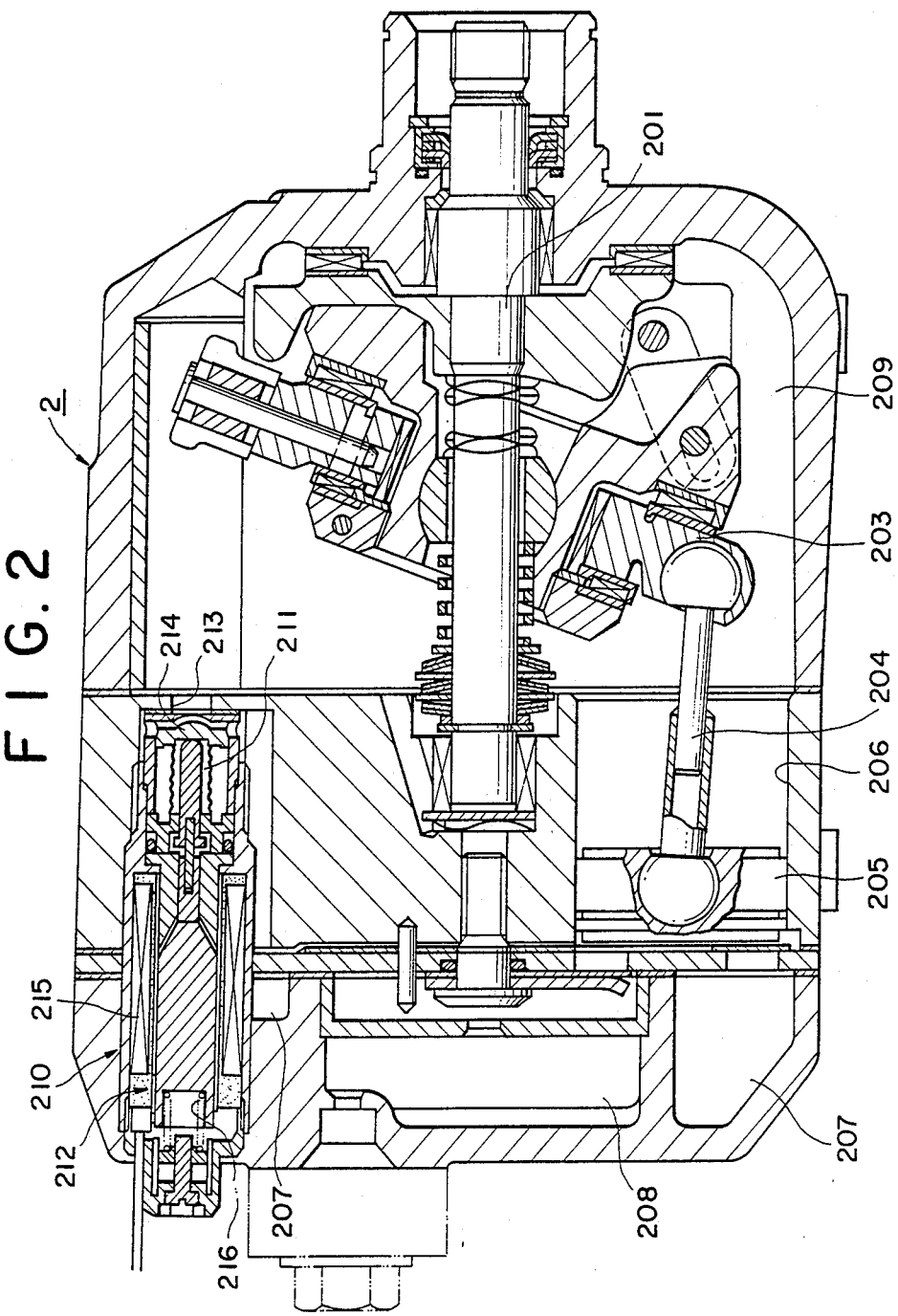
FIG. 2 is a longitudinal cross-sectional view of a variable capacity wobble plate compressor employed in the system of FIG. 1.

FIG. 2 shows the interior structure of the variable capacity wobble plate compressor. A drive shaft 201 of the compressor 2 is connected by way of a magnetic clutch 202 to an engine, not shown. When the magnetic clutch 202 is ON, torque from the engine is transmitted to the drive shaft 201 to drive the compressor. Mounted on the drive shaft 201 is a wobble plate 203 which is tiltable axially of the drive shaft 201. Pistons 205 are each connected by way of connecting rod 204 to one end of the wobble plate 203. The pistons are each arranged in a cylinder 206 for reciprocating motion to draw refrigerant into the cylinder 206 through a suction chamber 207, compress and discharge the refrigerant into a discharge chamber 208 wherefrom the refrigerant is supplied to the condenser 4.

The angle of inclination of the wobble plate 203 relative to the drive shaft 201 is determined by the balance between pressure within a crankcase 209 and the reaction force of the pistons 205. More specifically, if a communication passage 213, referred to hereinafter, is closed to increase the pressure within the crankcase 209, the angle of inclination of the wobble plate 203 relative to the drive shaft 201 decreases to thereby decrease the stroke of the pistons 205 so that the capacity of the compressor decreases. On the other hand, if the communication passage 213 is open to decrease the pressure within the crankcase 209, the angle of inclination of the wobble plate increase to thereby increase the stroke of the pistons 205 so that the capacity of the compressor increases.

The pressure within the crankcase 209 is controlled by a control valve 210 which is composed of a bellows 211 responsive to suction pressure within the suction chamber 207, an electromagnetic actuator 212, and a valve body 214 for opening and closing the communication passage 213 between the suction chamber 207 and the crankcase 209. The opening and closing of the valve body 214 is controlled by the balance between valve-closing pressure which acts upon the valve body 214 in the valve-closing direction and is determined by the sum of an attracting force generated by a solenoid 215 of the electromagnetic actuator 212, which is commensurate with an amount of electric current as a control signal supplied to the solenoid 215, and the urging force of a spring 216, and valve-opening pressure caused by the bellows 211 deformable by the suction pressure which acts upon the valve body by way of the bellows in the valve-opening direction. Specifically, with in crease in the amount of electric current as the control signal supplied to the solenoid 215, the valve-closing pressure is increased, whereby the pressure within the crank case 209 is increased to continuously reduce the capacity of the compressor. The amount of electric current as the control signal supplied to the solenoid 215 of the electromagnetic actuator 212 is controlled by the control unit 40.

Referring again to FIG. 1, the control unit 40 comprises a solenoid valve control circuit (first control means) 41 for controlling the opening and closing of the first and second solenoid valves 3, 6, and a compressor control circuit (second control means) 42 for supplying the magnetic clutch 202 of the compressor 2 with a control signal for turning it on or off, and for supplying the electromagnetic actuator 212 with the aforesaid control signal.

Figure 3:
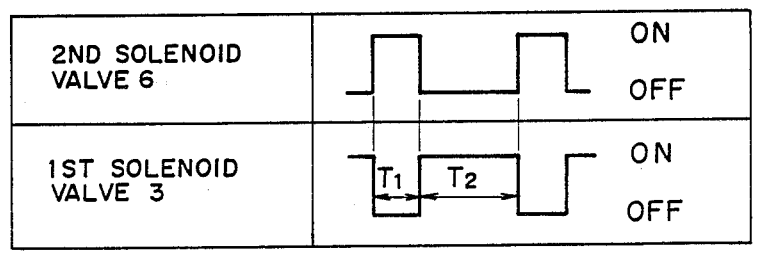
FIG. 3 is a timing chart of control signals for driving solenoid valves, useful in explaining the operation of a solenoid valve control circuit.

The solenoid valve control circuit 41 starts to operate when a refrigerator switch 43 connected thereto for operating the refrigerating unit 30 is turned on, and generates control signals shown in FIG. 3 to thereby altenatively open and close the first and second solenoid valves 3, 6. The opening period $T_1$ (e.g. 15 seconds) of the second solenoid valve 6, which corresponds to the closing period $T_1$ of the first solenoid valve, is shorter than the closing period $T_2$ (e.g. 30 second) of the second solenoid valve 6, which corresponds to the opening period $T_2$ of the first solenoid valve 3. This is for preferentially carrying out the cooling of the front and rear cooling units 10, 20.

When the first solenoid valve 3 is open and the second solenoid valve 6 is closed, the refrigerant flows through the cooling circuits each formed by the compressor 2, the condenser 4, the liquid tank 5, and the front or rear cooling unit 10 or 20, to cool the front and rear sides of the vehicle compartment. On the other hand, when the first solenoid valve 3 is closed and the second solenoid valve 6 is open, the refrigerant flows thorugh the refrigerating circuit formed by the compressor 2, the condenser 4, the liquid tank 5, and the refrigerating unit 30 to operate the refrigerator 1, whereby the chilling evaporator 32 chills the cold storage chamber and the freezing evaporator 33 freezes the freezing chamber.

The compressor control circuit 42 carries out ON/OFF control of the magnetic clutch 202 and capacity control of the compressor 2 in response to the ON/OFF signal from an air-conditioner switch 44 connected thereto for operating the front and rear cooling units 10, 20, and the aforesaid control signals from the solenoid valve control circuit 41, in a manner shown in Table 1 given below:

TABLE 1

| 2ND SOLENOID VALVE | 1ST SOLENOID VALVE | COMPRESSOR CONTROL CIRCUIT | |
|---|---|---|---|
| | | A/C SWITCH ON | A/C SWITCH OFF |
| Open | Closed | Maximum Capacity | <— |
| Closed | Open | Variable Capacity | Capacity = 0 or |

TABLE 1-continued

| 2ND SOLENOID VALVE | 1ST SOLENOID VALVE | COMPRESSOR CONTROL CIRCUIT | |
|---|---|---|---|
| | | A/C SWITCH ON | A/C SWITCH OFF |
| | | Control Responsive to Thermal Load | Magnetic Clutch OFF |

Specifically, when the second solenoid valve 6 is open and the first solenoid valve 3 is closed, the magnetic clutch 202 is energized (ON) irrespective of whether the air-conditioner (A/C) switch 44 is ON or OFF and at the same time the minimum amount of electric current as the control signal is supplied to the electromagnetic actuator 212 to obtain the maximum capacity of the compressor 2. On the other hand, when the secnd solenoid valve 6 is closed and the first solenoid valve 44 is open, if the air-conditioner switch 44 is ON, the magnetic clutch is energized (ON) and at the same time an amount of electrical current commensurate with thermal load on the compressor is supplied to the electromagnetic actuator 212 to vary the capacity of the compressor 2 so as to control the temperature of a fin of the evaporator 12 or another part of the evaporator 12 to a predetermined valve. On the other hand, if the air-conditioner switch is OFF, the maximum amount of electric current is supplied to the electromagnetic actuator 212 to make the capacity of the compressor zero, or the magnetic clutch 202 is turned off.

Figure 4:
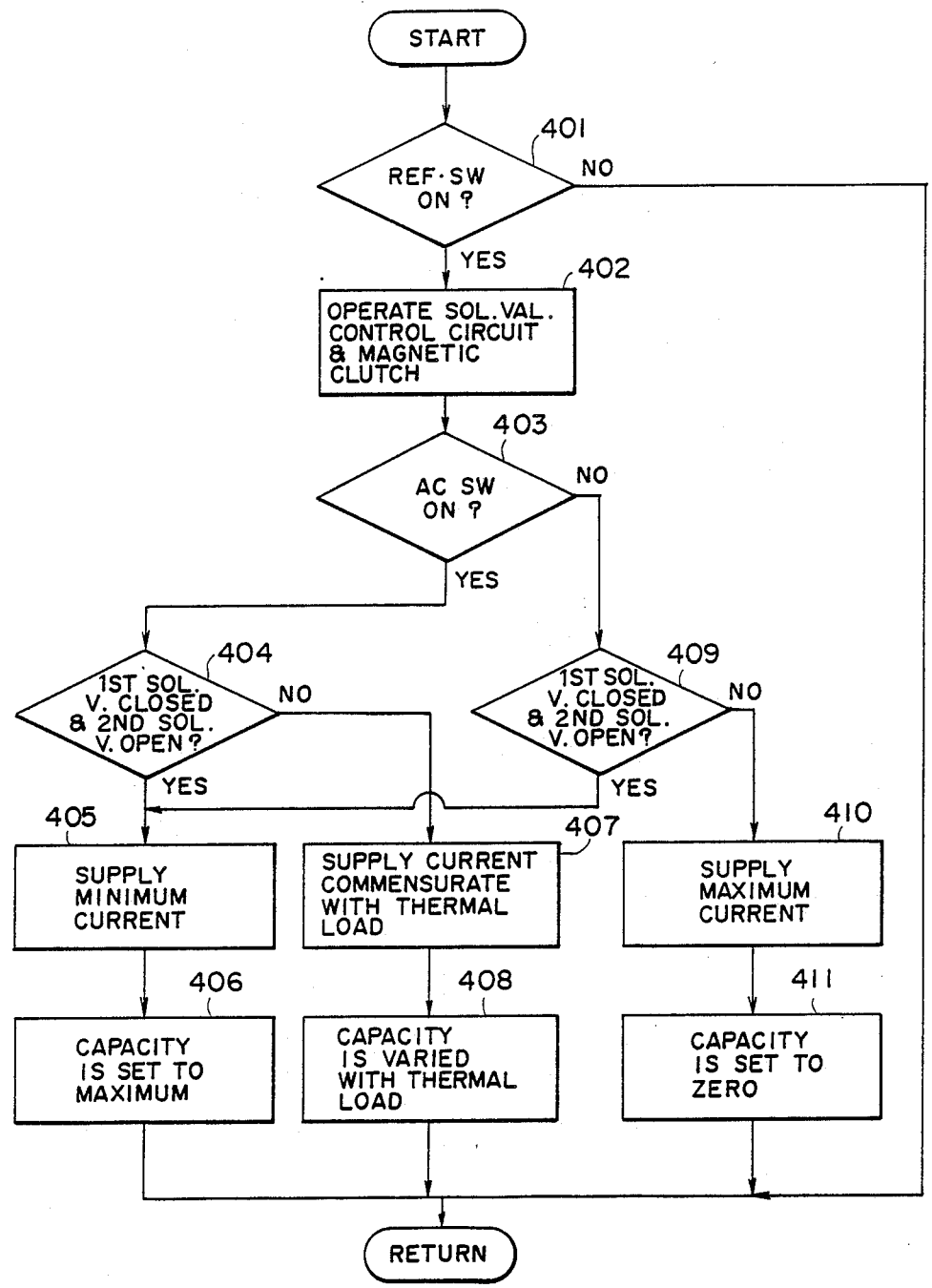
FIG. 4 is a flowchart showing a manner of controlling the compressor according to a first embodiment of the invention.

Next, the operation of the air conditioning control system according to the invention will be described with reference to FIG. 4.

If the refrigerator switch 43 is turned on (step 401), the solenoid valve control circuit 41 starts to operate and supply the control signals shown in FIG. 3 to the first and second solenoid valves 3, 6 to alternately open them (step 402). Further, the compressor control circuit 42 turns the magnetic clutch 202 on (step 402).

When both of the refrigerator switch 43 and the air conditioner switch 44 are ON, that is, when both the answers to steps 401, 403 are Yes, the compressor control circuit 42 supplies the electromagnetic actuator 212 with a control signal depending on output signals from the solenoid valve control circuit 41. More specifically, when it is determined at step 404 that the solenoid valve control circuit 41 supplies the second solenoid valve 6 with an ON signal, and the first solenoid valve 3 with an OFF signal, to thereby open the second solenoid valve 6 and close the first solenoid valve 3, the compressor control circuit 42 supplies the electromagnetic actuator 212 with the minimum amount of electric current as the control signal (step 405) to thereby make the capacity of the compressor 2 the maximum (step 406). This results in the maximum cooling capacity of the freezing evaporator 33 to make it possible to make ice in the freezing chamber. On the other hand, it is determined at step 404 that when the solenoid valve control circuit 41 supplies the second solenoid valve 6 with an OFF signal, and the first solenoid valve 3 with an ON signal, to thereby close the second solenoid valve 6 and open the first solenoid valve 3, the compressor control circuit 42 supplies the electromagnetic actuator 212 with an amount of electric current commensurate with the thermal load on the compressor, 2 (step 407), to thereby vary the capacity of the compressor 2 in response to the thermal load so as to control the fin temperature of the evaporator 12 or the like to the predetermined value.

When the refrigerator switch 43 is ON and the air-conditioner switch 44 is OFF, that is, when the answer to step 403 is No, and if at the same time, it is determined at step 409 that the second solenoid valve 6 is open and the first solenoid valve 3 is closed, the compressor control circuit 42 supplies the actuator 212 with the minimum amount of electric current (step 405) to make the capacity of the compressor 2 the maximum in the above described manner (step 406), whereas if it is determined at step 409 that the second solenoid valve 6 is closed and the first solenoid valve 3 is open, it supplies the electromagnetic actuaor 212 with the maximum amount of electric current (step 410) to make the capacity of the compressor zero (step 411) whereby the operation of the compressor 2 is substantially stopped.

Figure 5:
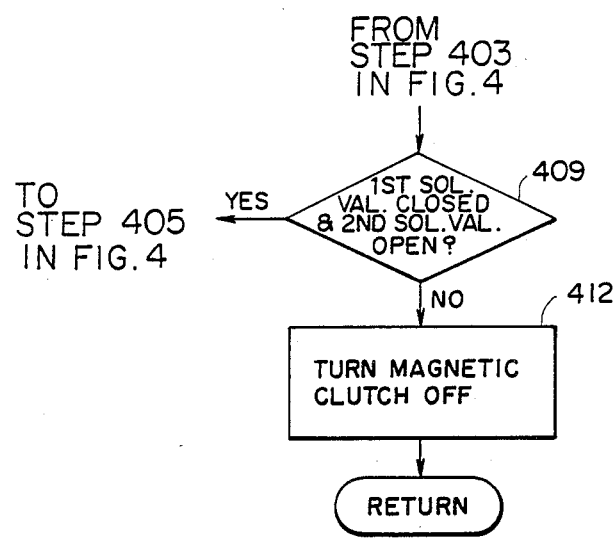
FIG. 5 is a partial flowchart showing a variation of the FIG. 4 embodiment.

Alternatively of making the compressor capacity zero as in steps 410, 411, the magnetic clutch 202 may be turned off, as shown by step 412 in FIG. 5.

As described above, if the refrigerator switch 43 is turned on, on condition that the second solenoid valve 6 is opend and the first solenoid valve 3 is closed, the compressor control circuit 42 makes the capacity of the compressor 2 the maximum irrespective of whether the air conditioner switch 44 is ON or OFF, whereby the freezing capacity of the refrigerator 1 becomes the maximum to make it possible to make ice in the freezing chamber.

Next a second embodiment of the present invention will be described with reference to Table 2 shown below and FIG. 6:

TABLE 2

| 2ND SOLENOID VALVE | 1ST SOLENOID VALVE | COMPRESSOR CONTROL CIRCUIT | |
|---|---|---|---|
| | | A/C SWITCH ON | A/C SWITCH OFF |
| Open | Closed | Variable Capacity Control Responsive to Temperature inside Freezer | <— |
| Closed | Open | Variable Capacity Control Responsive to Thermal Load | Capacity = 0 or Magnetic Clutch OFF |

According to the second embodiment of the invention, if the refrigerator switch 43 is ON (step 601), when it is determined at step 604 that the second solenoid valve 6 is open and the first solenoid valve 3 is closed, instead of making the capacity of the compressor 2 the maximum as in the above described first embodiment, the compressor control circuit 42 supplies the electromagnetic actuator 212 with a control signal having an amount of electric current commensurate with the temperature within the freezing chamber of the refrigerator (step 605). Except for the steps 605, 606, all the steps 601–604, and 607–611 in FIG. 6 correspond, respectively, to the steps 401–404, and 407–411 in FIG. 4, for varying the capacity of the compressor 2 in such a manner that the temperature within the freezing chamber of the refrigerator 1 is controlled to a predetermined freezing temperature (e.g. −5° C. to −10° C.), i.e. the temperature or pressure at the outlet of the freezing evaporator 33 is controlled to a predetermined value (step 606).

In the second embodiment, since the capacity of the compressor 2 is varied in such a manner that the temperature or pressure at the outlet of the evaporator 33 is controlled to a predetermined value, the low pressure switch 35 used in the first embodiment can be omitted.

Figure 7:
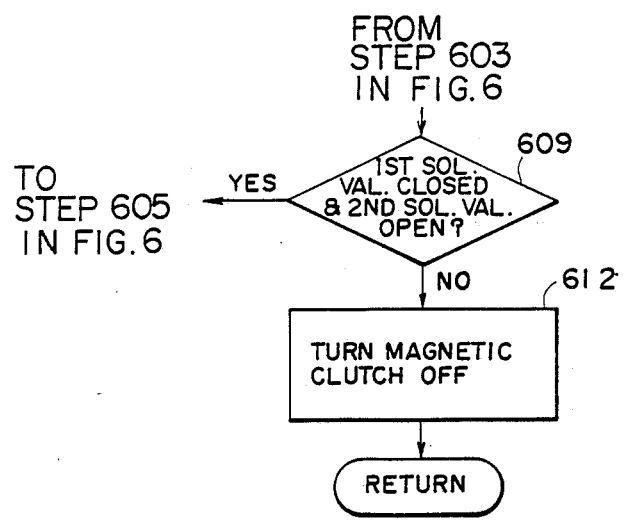
FIG. 7 is a partial flowchart showing a variation of the FIG. 6 embodiment.
Figure 6:
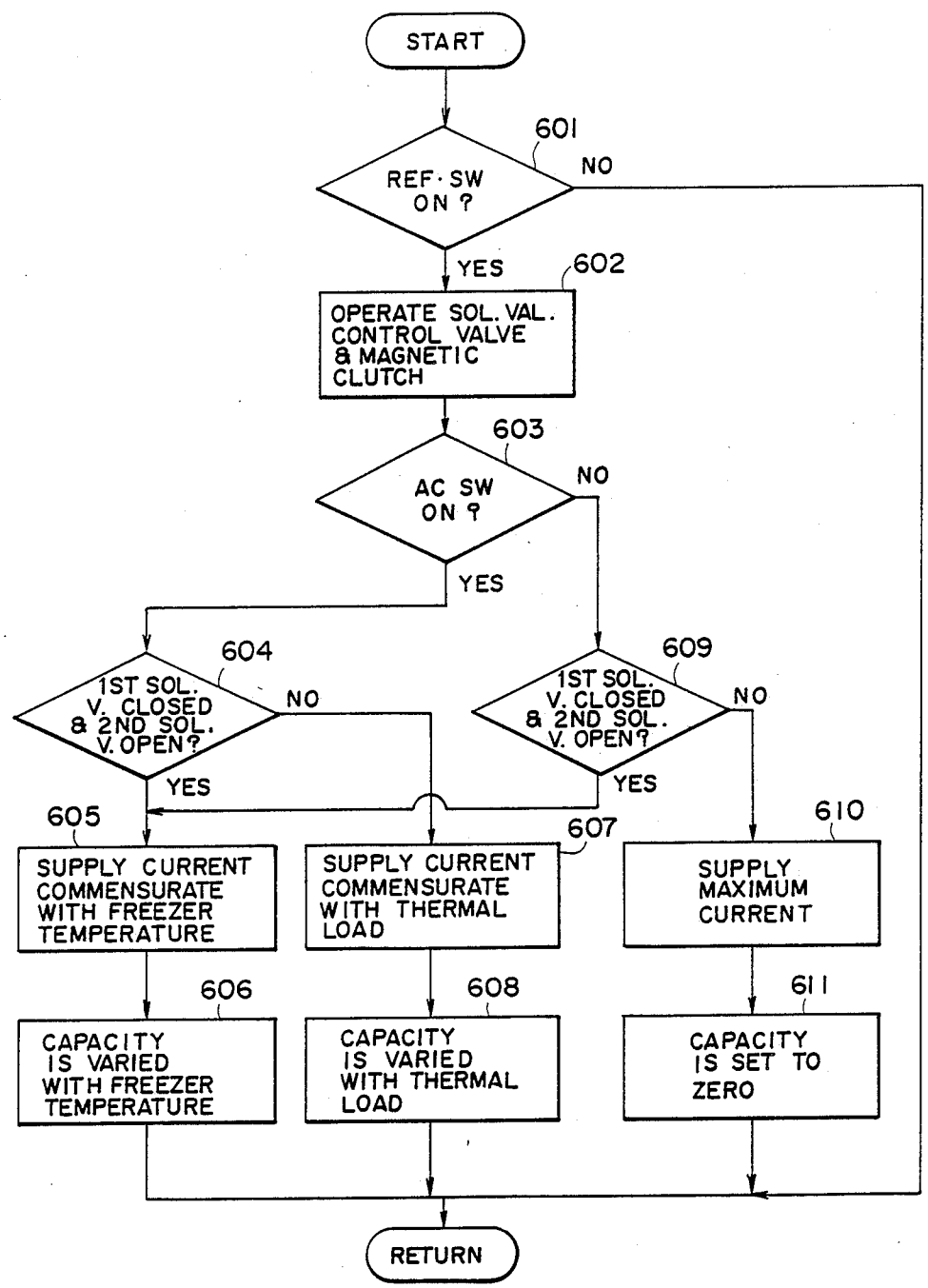
FIG. 6 is a flowchart showing a manner of controlling the compressor according to a second embodiment of the invention.

Also in the second embodiment of FIG. 6, the magnetic clutch 202 may be turned off as shown by step 612 in FIG. 7, instead of making the compressor capacity zero as in steps 610, 611 in FIG. 6.

Any type of variable capacity compressor other than the wobble plate type may also be used in the invention.

What is claimed is:

1. An air conditioning control system for use in an automotive vehicle including a compartment, and a refrigerator having a freezing chamber, which comprises:
    a variable capacity compressor having the capacity thereof being variable by an external control signal;
    at least one first cooling unit for cooling said compartment;
    a second cooling unit for cooking said refrigerator;
    a first valve arranged between said compressor and an inlet side of said at least one first cooling unit for connecting them to cause same to form a cooling circuit to thereby enable refrigerant to be supplied to said at least one first cooling unit when said first valve is open;
    a second valve arranged between said compressor and an inlet side of said second cooling unit for connecting them to cause same to form a refrigerating circuit to thereby enable refrigerant to be supplied to said second cooling unit when said second valve is open;
    first control means for alternately opening and closing said first and second valve at predetermined constant time intervals independents of temperatures of said at least one first cooling unit and of said second cooling unit; and
    second control means responsive to opening and closing of said first and second valves for supplying a predetermined control signal to said compressor, when said second valve is open, for causing increasing of the capacity of said compressor to such a degree as to enable making ice in said freezing chamber of said refrigerator.

2. An air-conditioning control system as claimed in claim 1, wherein said predetermined control signal makes the capacity of said compressor the maximum.

3. An air-conditioning control system as claimed in claim 2, including a switch for operating said first cooling unit, and wherein said second control means supplies said predetermined control signal to said compressor irrespective of whether said switch is closed or open.

4. An air-conditioning control system as claimed in claim 1, wherein said predetermined control signal varies the capacity of said compressor such that temperature within said freezing chamber becomes equal to a predetermined freezing temperature.

5. An air-conditioning control system as claimed in claim 4, including a switch for operating said first cooling unit, and wherein said second control means supplies said predetermined control signal to said compressor irrespective of whether said switch is closed or open.

6. An air-conditioning control system as claimed in claim 1, including a switch for operating said first cooling unit, and wherein said second control means supplies said predetermined control signal to said compressor irrespective of whether said switch is closed or open.

7. An air-conditioning control system as claimed in claim 1, wherein if said switch is closed, said second control means varies the capacity of compressor in response to thermal load thereon when said second valve is closed.

8. An air-conditioning control system as claimed in claim 1, wherein if said switch is open, said second control means substantially stops the operation of said compressor when said second valve is closed.

* * * * *